US009832209B1

(12) United States Patent
Cooley et al.

(10) Patent No.: US 9,832,209 B1
(45) Date of Patent: Nov. 28, 2017

(54) SYSTEMS AND METHODS FOR MANAGING NETWORK SECURITY

(71) Applicant: Symantec Corporation, Mountain View, CA (US)

(72) Inventors: Shaun Cooley, El Segundo, CA (US); Jeffrey Wilhelm, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 638 days.

(21) Appl. No.: 13/914,608

(22) Filed: Jun. 10, 2013

(51) Int. Cl.
*H04L 29/00* (2006.01)
*H04L 29/06* (2006.01)

(52) U.S. Cl.
CPC .................. *H04L 63/1408* (2013.01)

(58) Field of Classification Search
CPC .............. H04L 63/1441; H04L 63/1416; H04L 63/1483; H04L 2463/144; H04L 63/00; H04L 63/10; G06F 21/51; G06F 21/00
See application file for complete search history.

(56) References Cited

U.S. PATENT DOCUMENTS

| 2010/0037314 | A1* | 2/2010 | Perdisci et al. ............... 726/22 |
| 2011/0185428 | A1* | 7/2011 | Sallam ............... 726/24 |
| 2012/0084423 | A1* | 4/2012 | McGleenon ............... 709/223 |
| 2012/0110672 | A1* | 5/2012 | Judge et al. ............... 726/25 |
| 2013/0074186 | A1* | 3/2013 | Muttik ............... 726/24 |

* cited by examiner

*Primary Examiner* — Brandon Hoffman
*Assistant Examiner* — Helai Salehi
(74) *Attorney, Agent, or Firm* — FisherBroyles LLP

(57) ABSTRACT

A computer-implemented method for managing network security may include identifying a set of trusted Internet domains, identifying traffic information that indicates Internet traffic volume for each trusted Internet domain in the set of trusted Internet domains, and analyzing the traffic information to select, from the set of trusted Internet domains, a subset of trusted Internet domains that each have higher Internet traffic volume than one or more other trusted Internet domains in the set of trusted Internet domains. The method may also include including the selected subset of trusted Internet domains in an Internet domain whitelist. The method may further include configuring a network gateway system to perform a less intensive scan on Internet traffic that originates from an Internet domain identified in the Internet domain whitelist than on traffic that originates from other Internet domains. Various other methods, systems, and computer-readable media are also disclosed.

20 Claims, 6 Drawing Sheets

SYSTEMS AND METHODS FOR MANAGING NETWORK SECURITY

BACKGROUND

Traditional network gateway devices may perform security scans on incoming traffic to identify and block malicious Internet content. Unfortunately, only the most powerful and expensive gateway devices are able to scan all of the incoming web traffic and still maintain desired throughput speeds. Most consumers are unlikely to buy such a powerful and expensive device for use in a home or a small business. Instead, most consumers are likely to purchase cheaper (e.g., consumer-grade) devices that are unable to efficiently scan all incoming web traffic.

To maintain data throughput speeds and provide some security, consumer-grade devices may enable an end user to choose Internet domains whose data will not be scanned. Unfortunately, end-user selection of such Internet domains may result in a variety of problems. For example, a user may set up a gateway device to bypass scanning an insecure domain or sub-domain, which may compromise security of the user's network. As another example, a user's selection of domains for which scanning is bypassed may result in inefficient security scanning on a gateway device, which may result in slower data throughput.

Accordingly, the instant disclosure identifies a need for additional and improved methods for managing network security.

SUMMARY

As will be described in greater detail below, the instant disclosure generally relates to systems and methods for managing network security. In one example, a computer-implemented method for managing network security may include (1) identifying a set of trusted Internet domains, (2) identifying traffic information that indicates Internet traffic volume for each trusted Internet domain in the set of trusted Internet domains, (3) analyzing the traffic information to select, from the set of trusted Internet domains, a subset of trusted Internet domains that each have higher Internet traffic volume than one or more other trusted Internet domains in the set of trusted Internet domains, (4) including the selected subset of trusted Internet domains in an Internet domain whitelist, and (5) configuring a network gateway system to perform a less intensive scan on Internet traffic that originates from any Internet domain identified in the Internet domain whitelist than on traffic that originates from other Internet domains that are not identified in the Internet domain whitelist.

In some examples, the method may also include (1) determining a hardware configuration of the network gateway system, (2) determining that the hardware configuration of the network gateway system limits traffic scanning ability of the network gateway system, and (3) determining, based on the traffic scanning ability of the network gateway system, how many trusted Internet domains are to be selected for inclusion in the Internet domain whitelist.

According to certain embodiments, configuring the network gateway system to perform a less intensive scan on Internet traffic that originates from any Internet domain identified in the Internet domain whitelist may include configuring the network gateway system to refrain from scanning data that originates from any Internet domain identified in the Internet domain whitelist. Additionally or alternatively, the method may also include configuring the network gateway system to bypass central-processing-unit processing of data that originates from any Internet domain identified in the Internet domain whitelist.

In some examples, the method may also include (1) receiving, from a plurality of users within a community of users, information about content received from a plurality of Internet domains, (2) using the information about the content received from the plurality of Internet domains to determine a reputation for each Internet domain in the plurality of Internet domains, and (3) selecting, based on the reputation of each Internet domain in the plurality of Internet domains, at least one Internet domain for inclusion in the set of trusted Internet domains. In such embodiments, determining the reputation for each Internet domain in the plurality of Internet domains may include, for each Internet domain, (1) identifying, within the information about the content received from the plurality of Internet domains, information about a security event triggered by the Internet domain and then (2) using the security event information to determine the reputation of the Internet domain.

In some examples, the method may also include at least one of: (1) sending the Internet domain whitelist to the network gateway system or (2) using the Internet domain whitelist to update a whitelist already included in the network gateway system. Additionally or alternatively, the method may include excluding, from the Internet domain whitelist, one or more untrusted subdomains of any Internet domain in the Internet domain whitelist.

In one embodiment, a system for implementing the above-described method may include (1) a domain-identification module that identifies a set of trusted Internet domains, (2) a traffic-identification module that identifies traffic information that indicates Internet traffic volume for each trusted Internet domain in the set of trusted Internet domains, (3) a selection module that analyzes the traffic information to select, from the set of trusted Internet domains, a subset of trusted Internet domains that each have higher Internet traffic volume than one or more other trusted Internet domains in the set of trusted Internet domains, (4) a whitelist module that includes the selected subset of trusted Internet domains in an Internet domain whitelist, (5) a security module that configures a network gateway system to perform a less intensive scan on Internet traffic that originates from any Internet domain identified in the Internet domain whitelist than on traffic that originates from other Internet domains, and (6) at least one hardware processor configured to execute at least one of the domain-identification module, the traffic-identification module, the selection module, the whitelist module, and the security module.

In some examples, the above-described method may be encoded as computer-executable instructions on a non-transitory computer-readable-storage medium. For example, a non-transitory computer readable-storage medium may include one or more computer-executable instructions that, when executed by at least one processor of a computing device, may cause the computing device to (1) identify a set of trusted Internet domains, (2) identify traffic information that indicates Internet traffic volume for each trusted Internet domain in the set of trusted Internet domains, (3) analyze the traffic information to select, from the set of trusted Internet domains, a subset of trusted Internet domains that each have higher Internet traffic volume than one or more other trusted Internet domains in the set of trusted Internet domains, (4) include the selected subset of trusted Internet domains in an Internet domain whitelist, and (5) configure a network gateway system to perform a less intensive scan on Internet traffic that originates from any Internet domain identified in the Internet domain whitelist than on traffic that originates from other Internet domains.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
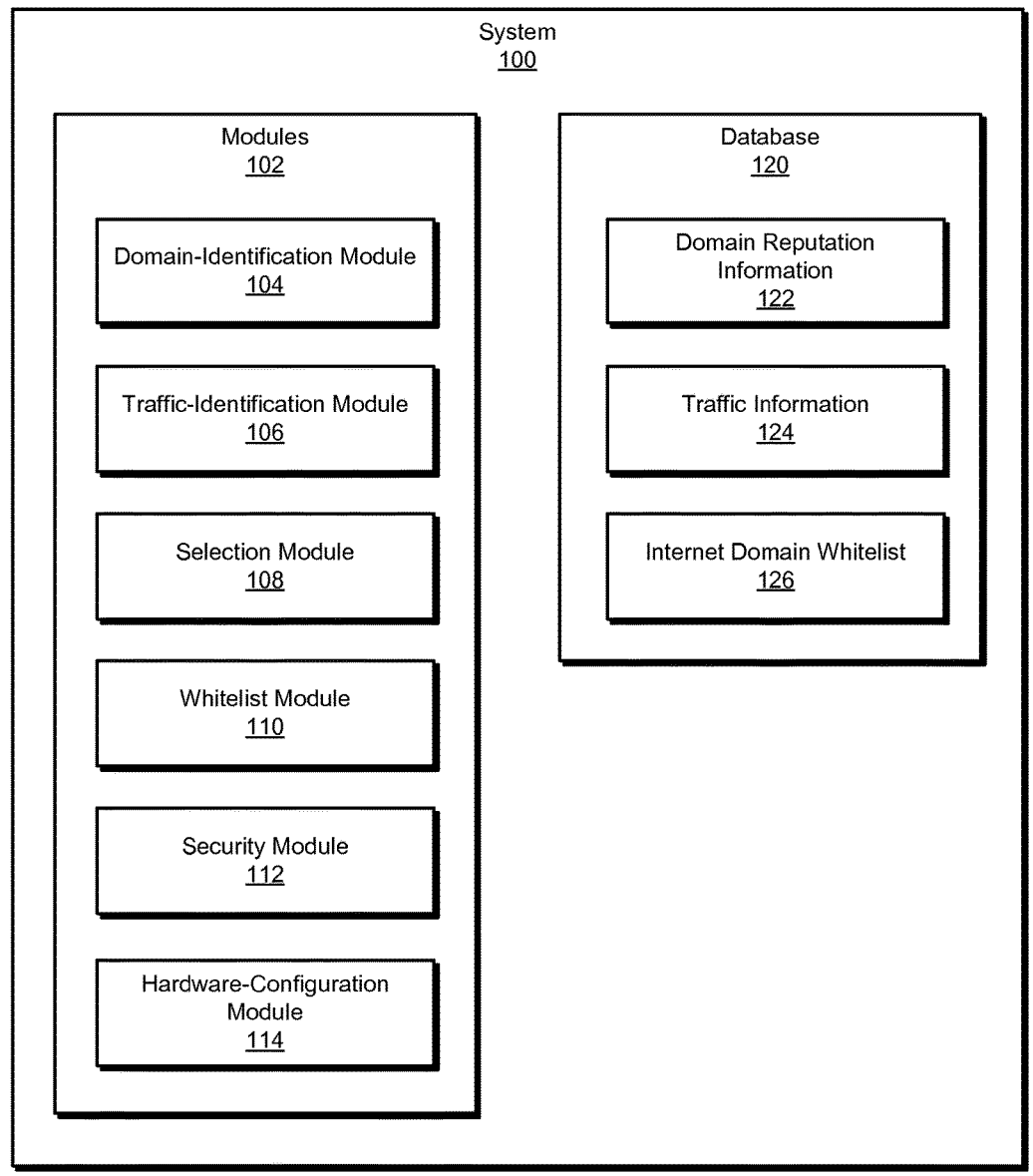
FIG. 1 is a block diagram of an exemplary system for managing network security.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing network security. As will be explained in greater detail below, the systems and methods described herein may provide intelligent selection of network traffic that can pass through a network gateway device without inspection (or with less intensive inspection). For example, embodiments of the instant disclosure may configure a network gateway device to bypass scanning for relatively high-traffic, trusted Internet domains. The systems and methods described herein may also provide hardware acceleration in network gateway devices that causes the network gateway devices to, in addition to bypassing scanning for high-traffic trusted Internet domains, bypass CPU processing altogether for such domains. By creating optimized whitelists for bypassing scanning and/or CPU processing for certain Internet domains, the systems and methods described herein may improve security and/or scanning efficiency for various types of gateway devices (e.g., gateway devices with limited resources).

Figure 2:
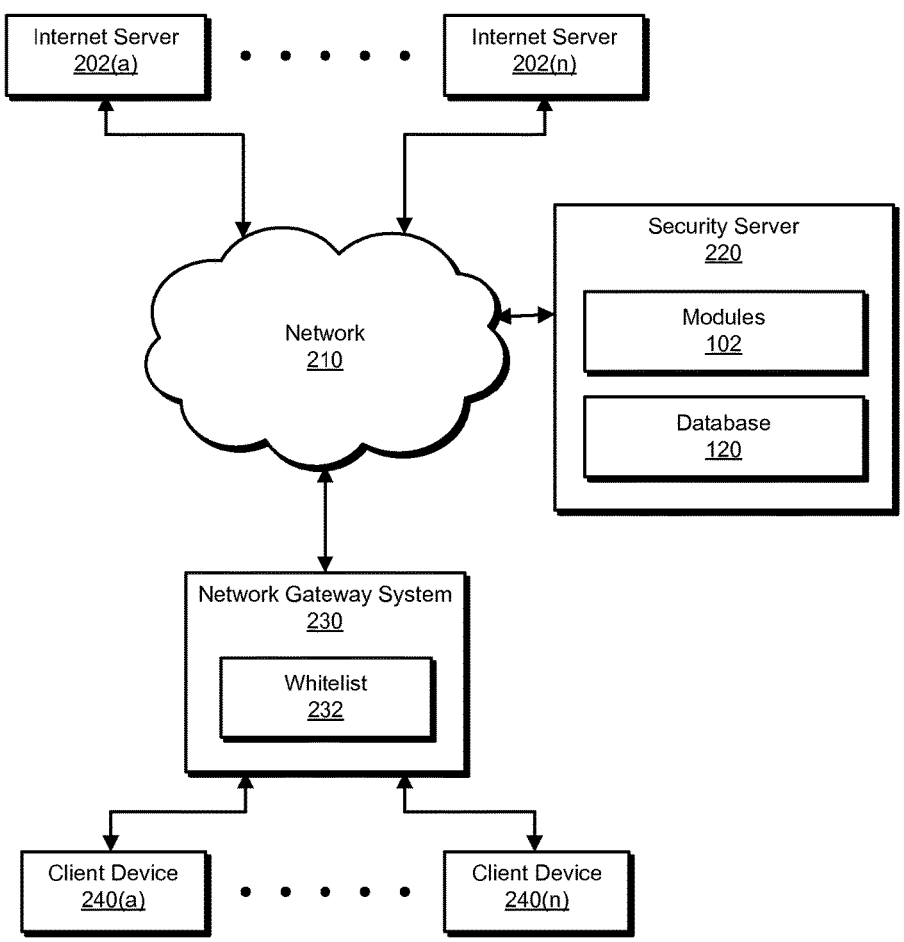
FIG. 2 is a block diagram of another exemplary system for managing network security.

The following will provide, with reference to FIGS. 1 and 2, detailed descriptions of exemplary systems for managing network security. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing network security. As illustrated in this figure, exemplary system 100 may include one or more modules 102 for performing one or more tasks. For example, and as will be explained in greater detail below, exemplary system 100 may include a domain-identification module 104 that identifies a set of trusted Internet domains. Exemplary system 100 may also include a traffic-identification module 106 that identifies traffic information that indicates Internet traffic volume for each trusted Internet domain in the set of trusted Internet domains.

In addition, and as will be described in greater detail below, exemplary system 100 may include a selection module 108 that analyzes the traffic information to select, from the set of trusted Internet domains, a subset of trusted Internet domains that each have higher Internet traffic volume than one or more other trusted Internet domains in the set of trusted Internet domains. System 100 may also include a whitelist module 110 that includes the selected subset of trusted Internet domains in an Internet domain whitelist and a security module 112 that configures a network gateway system to perform a less intensive scan on Internet traffic that originates from any Internet domain identified in the Internet domain whitelist than on traffic that originates from other Internet domains. In some embodiments, system 100 may also include a hardware-configuration module 114 that is programmed to detect the hardware configuration of a network gateway system and use the hardware configuration to determine the size of an Internet domain whitelist. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., security server 220 and/or client devices 240(a)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store domain reputation information 122. The phrase "domain reputation information," as used herein, may refer to any type or form of reputation information for web domains. Domain reputation information may be obtained from and/or stored within any suitable service or system. Examples of domain reputation information 414 may include, without limitation, SHASTA ratings, web searches, SITE ADVISOR ratings, and Domain Analysis and Signature Heuristics (DASH) ratings. Domain reputation information may be obtained from independent, one or more third-party sources of reputations that calculate reputations using methods that are independent, supplemental, and/or partially redundant to the exemplary methods described herein. In addition to or instead of obtaining third-party reputation information, embodiments of the instant disclosure may establish reputations for Internet domains based on information collected about content provided by the Internet domains.

As shown in FIG. 1, database 120 may also store traffic information 124, which may include any type or form of information about Internet traffic volume from Internet domains. The phrase "traffic volume," as used herein, generally refers to any measure of Internet traffic intensity over a period of time. For example, traffic volume information for a domain may indicate how much data is provided through the domain in an hour, a day, a week, a month, etc. Additionally or alternatively, traffic volume information may indicate how many users visited an Internet domain over a period of time and/or any other metric indicating the frequency and/or intensity with which an Internet domain is accessed.

Database 120 may also store an Internet domain whitelist 126, which may identify one or more trusted Internet domains for which less intensive scanning (or no scanning) is to be performed.

Database 120 may represent portions of a single database or computing device or a plurality of databases or computing devices. For example, database 120 may represent a portion of security server 220 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as security server 220 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include Internet servers 202(a)-(n), a security server 220, a network gateway system 230, and client devices 240(a)-(n). Client devices 240(a)-(n) may communicate with Internet servers 202(a)-(n) and security server 220 via network 210.

Client devices 240(a)-(n) generally represent any type or form of computing device capable of reading computer-executable instructions. Examples of client devices 240(a)-(n) include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Network gateway system 230 generally represents any device, system, or application capable of routing or forwarding information, which may be in the form of packets, among devices of a computing network. For example, network gateway system 230 may connect client devices 240(a)-(n) to network 210. Examples of network gateway systems include, without limitation, any suitable type or form of network gateways, hubs, switches, bridges, and/or routers. Network gateway system 230 may include a residential gateway device and/or an enterprise gateway device.

Internet servers 202(a)-(n) generally represent any type or form of server capable of providing data and/or services over the Internet. Servers 202(a)-(n) may include any type of computing system or service.

Security server 220 generally represents any type or form of computing system capable of performing one or more of the security functions for network gateway system 230. As shown in FIG. 2, security server 220 may include modules 102 and database 120. Modules 102 and/or database 102 may program security server 220 to perform one or more of the functions described herein, as discussed in greater detail below. For example, security module 112 may cause security server 220 to configure network gateway system 230 to perform a less intensive scan on Internet traffic that originates from Internet server 202(a) than traffic that originates from Internet server 202(n).

Security server 220 may communicate with network gateway system 230 via network 210. Network 210 generally represents any medium or architecture capable of facilitating communication or data transfer. Examples of network 210 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 210 may facilitate communication or data transfer using wireless or wired connections.

Figure 3:
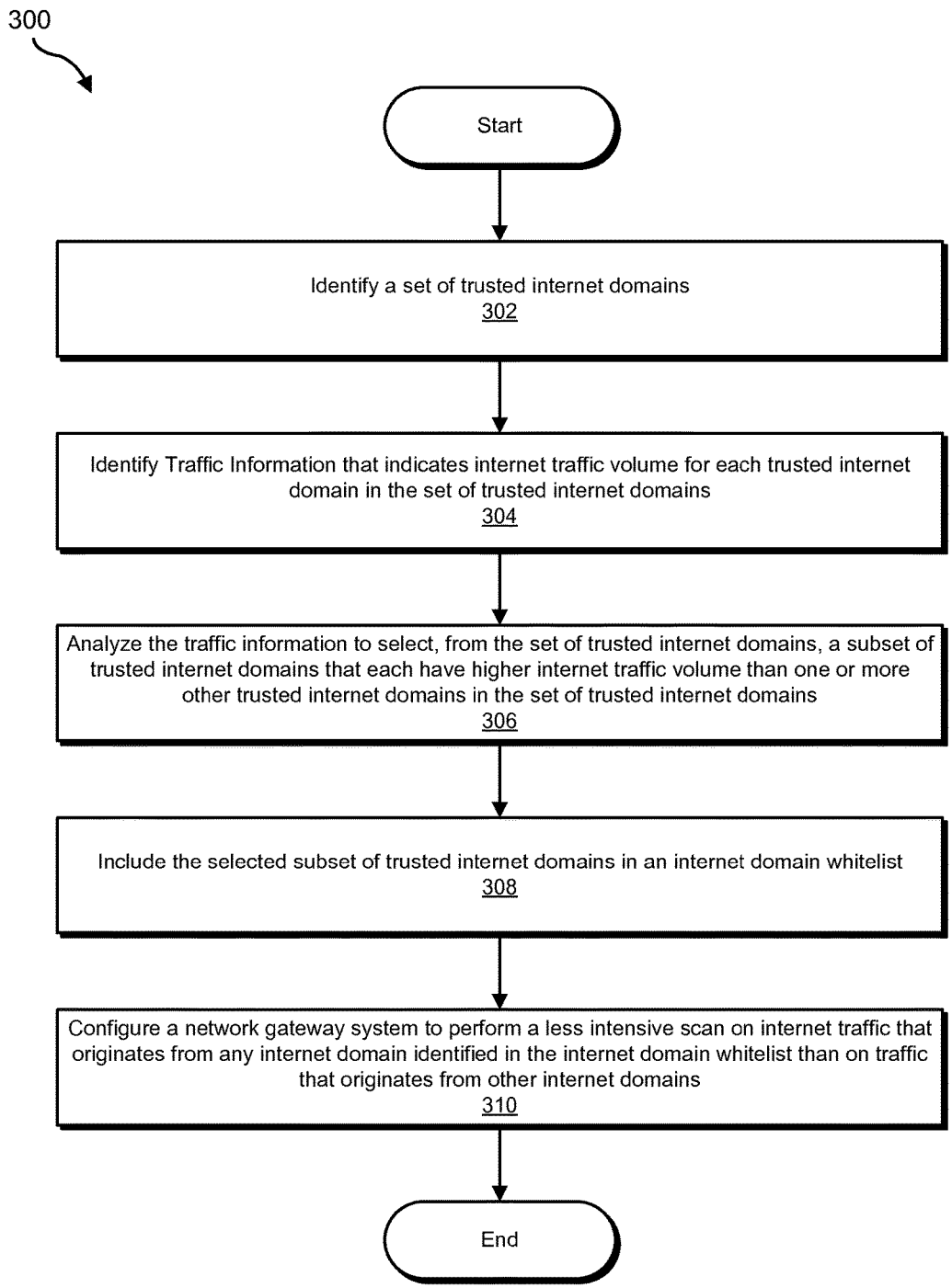
FIG. 3 is a flow diagram of an exemplary computer-implemented method for managing network security.

FIG. 3 is a flow diagram of an exemplary computer-implemented method 300 for managing network security. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a set of trusted Internet domains. For example, at step 302 domain-identification module 104 may, as part of security server 220 in FIG. 2, identify a set of trusted Internet domains. As used herein, the phrase "Internet domain" generally refers to any identification information (e.g., string of data or labels) that defines a realm of administrative autonomy, authority, and/or control on the Internet. An Internet domain may represent any type of Internet Protocol (IP) resource, such as a website, a server that hosts a website (e.g., Internet servers 202(a)-(n)), a personal computing system with Internet access, and/or any other system connected to the Internet and/or service provided via the Internet.

As used herein, the phrase "trusted Internet domain" generally refers to any Internet domain that has been previously identified as trusted (i.e., has been previously verified to generally provide non-malicious content). In order to be identified as "trusted," an internet domain may have to satisfy certain criteria, such as having a history of not distributing malicious software (such as malware, viruses, spyware, adware, etc.). Examples of trusted Internet domains may include, without limitation, major or popular company domains (such as, for example, www.symantec.com, www.microsoft.com, etc.), domains that provide high volumes of internet content (e.g., www.youtube.com, www.netflix.com, etc.), and/or various other types of Internet domains.

Domain-identification module 104 may identify a set of trusted Internet domains in a variety of ways and/or from a variety of sources. For example, domain-identification module 104 may identify trusted Internet domains by querying a domain reputation source (examples of reputation sources are discussed above) for domain reputation information, such as domain reputation information 122. Upon receiving reputation information from a reputation source, domain-identification module 104 may select, based on the reputation information, at least one Internet domain for inclusion in the set of trusted Internet domains.

Domain-identification module 104 may use reputation information to select trusted Internet domains in any suitable manner. In some embodiments, domain-identification module 104 may identify trusted domains by selecting only Internet domains with the highest security reputations. For example, to identify a set of trusted Internet domains, domain-identification module 104 may select Internet domains that have triggered fewer than a predetermined number of security events, Internet domains that have a long history of content free from malware, and/or Internet domains that are generally trusted (e.g., as indicated by third-party reputations sources) sources of Internet content.

In addition to or instead of obtaining domain reputation information from third-party reputation sources, domain-identification module 104 may obtain information about content provided by Internet domains to establish and update reputations for Internet domains. For example, domain-identification module 104 may implement any technology that leverages crowd-sourcing (e.g., obtaining information from numerous systems and customers or other users) to determine whether Internet domains are trustworthy. In such embodiments, domain-identification module 104 may receive, from one or more users within a community of users, information about content received from various Internet domains. Domain-identification module 104 may use the information about the content received from the Internet domains to establish and/or update domain reputations. Domain-identification module 104 may then select, based on the reputations of each Internet domain in the plurality of Internet domains, at least one Internet domain for inclusion in the set of trusted Internet domains.

In some embodiments, domain-identification module 104 may determine reputations for Internet domains by identifying information about any security events triggered by the Internet domains. For example, domain-identification module 104 may receive, from one or more remote computing systems, identification of an Internet domain that triggered a security event on a computing system. The phrase "security event," as used herein, may refer to any event that may compromise the state of security of a user's computing device and/or data. Examples of such security events include, without limitation, attempts by software or files originating from an internet domain to infiltrate, modify, harm, or otherwise access a user's computer or data without authorization. Upon determining that an Internet domain triggered a security event, domain-identification module 104 may use information about the security event to determine, establish, or update the reputation of the Internet domain (e.g., by decreasing a reputation rating of the Internet domain).

At step 304 in FIG. 3, one or more of the systems described herein may identify traffic information that indicates Internet traffic volume for each trusted Internet domain in the set of trusted Internet domains. For example, traffic-identification module 106 may, as part of security server 220 in FIG. 2, identify traffic information 124 and search traffic information 124 for traffic data of each Internet domain in the set of trusted Internet domains.

Traffic-identification module 106 may identify traffic information 124 of trusted Internet domains in a variety of ways. For example, traffic-identification module 106 may identify traffic information 124 by querying a remote server and/or third-party service (e.g., ALEXA traffic rankings, QUANTCAST, COMPETE, etc.) for traffic data of one or more trusted Internet domains. Additionally or alternatively, traffic-identification module 106 may identify traffic information 124 by monitoring traffic for one or more trusted Internet domains.

At step 306 in FIG. 3, one or more of the systems described herein may analyze the traffic information to select, from the set of trusted Internet domains, a subset of trusted Internet domains that each have higher Internet traffic volume than one or more other trusted Internet domains in the set of trusted Internet domains. For example, selection module 108 may use traffic information 124 to select, from the set of trusted Internet domains, one or more Internet domains with relatively high Internet traffic volume.

Selection module 108 may use traffic information 124 to select a subset of trusted Internet domains in a variety of manners. For example, selection module 108 may use traffic information 124 to identify trusted domains with the highest volume (e.g., highest traffic levels, highest data transfer rates, highest number of hits or visitors, etc.) of Internet traffic. Selection module 108 may select the subset of Internet domains for use in default whitelists and/or whitelists that are customized for particular users and/or gateways systems, as discussed in greater detail below.

The number of Internet domains selected for inclusion in a whitelist may be determined in a variety of ways. Selection module 108 may implement any suitable algorithm and/or heuristic to determine an intersection of the most trusted Internet domains and the highest volume Internet domains. For example, selection module 108 may select all Internet domains with reputations above a predetermined threshold and traffic volume higher than a predetermined threshold.

In addition to evaluating reputation and traffic volume information, selection module 108 may consider a variety of other types of information in determining which Internet domains are to be selected for inclusion in a domain whitelist. In some embodiments, selection module 108 may consider the types of data typically provided by an Internet domain to determine whether the Internet domain should be selected for inclusion in a whitelist. For example, selection module 108 may prioritize Internet domains that provide high volumes of media content (e.g., NETFLIX, YOUTUBE, etc.) over other Internet domains for use in domain whitelists. Additionally or alternatively, selection module 108 may consider the types of data typically accessed by a user or through a particular gateway to determine which Internet domains should be included on a whitelist. For example, if selection module 108 detects that the highest volume of traffic managed by a gateway system is gaming-related traffic, selection module may prioritize Internet domains that provide gaming services over other Internet domains for whitelist selection.

Figure 4:
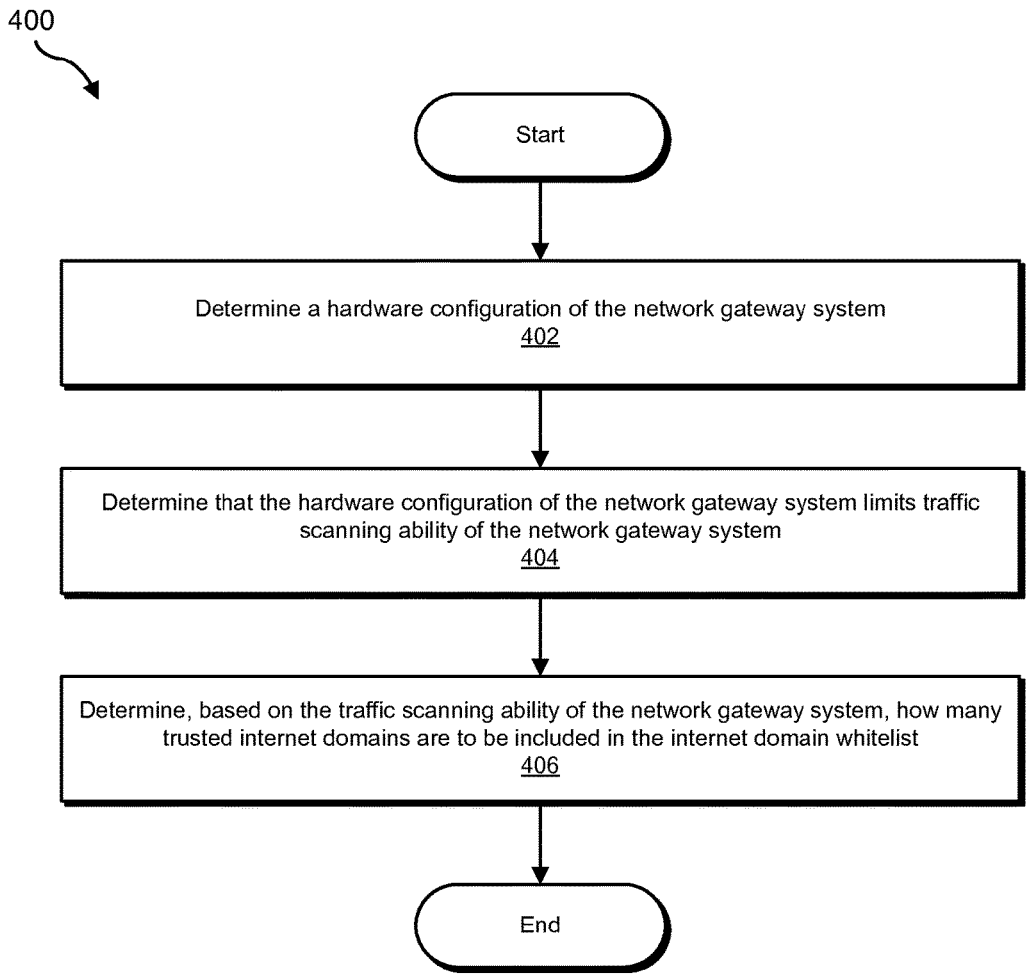
FIG. 4 is a flow diagram of another exemplary computer-implemented method for managing network security.

In some embodiments, selection module 108 may use hardware configuration information of a particular router to determine how many Internet domains are to be selected for inclusion in a whitelist, as shown in exemplary computer-implemented method 400 of FIG. 4. At step 402 in FIG. 4, one or more of the systems described herein may determine a hardware configuration of a network gateway system. For example, hardware-configuration module 114 may, as part of security server 220, determine a hardware configuration of network gateway system 230.

Hardware-configuration module 114 may identify various types of hardware configuration information for network gateway system 230. For example, hardware-configuration module 114 may identify processing capability (e.g., processor speed, processor type, processor cache sizes, etc.) of network gateway system 230. As another example, hardware-configuration module 114 may identify memory capacity (e.g., hard drive size and/or speed, RAM size and/or speed, etc.) of network gateway system 230. Hardware-configuration module 114 may also determine any hardware acceleration capabilities and/or other configuration details of network gateway system 230.

Hardware-configuration module 114 may determine the hardware configuration of network gateway system 230 in a variety of different manners. For example, hardware-configuration module 114 may query network gateway system 230 for configuration information. Additionally or alternatively, hardware-configuration module 114 may query network gateway system 230 for manufacturer and/or model information and may use this information to look up configuration data in a local or remote database. In some embodiments, hardware-configuration module 114 may receive configuration information and/or model information from a user (e.g., via a user interface provided by security server 220 for defining security settings for network gateway system 230) and/or any other suitable source.

At step 404 in FIG. 4, one or more of the systems described herein may determine that the hardware configuration of the network gateway system limits the traffic scanning ability of the network gateway system. For example, hardware-configuration module 114 may determine that the hardware configuration of network gateway system 230 limits the traffic scanning abilities of network gateway system 230. Hardware-configuration module 114 may determine that network gateway system 230 has limited scanning capabilities in a variety of ways. For example, hardware-configuration module 114 may determine that network gateway system 230 lacks the processing power and/or memory to handle a significant traffic-scanning burden. As another example, in embodiments where hardware-configuration module 114 identifies a model of network gateway system 230, hardware-configuration module 114 may determine that network gateway system 230 has limited scanning capabilities by identifying network gateway system 230 on a list of network gateway systems with limited scanning capabilities.

At step 406 in FIG. 4, one or more of the systems described herein may determine, based on the traffic scanning ability of the network gateway system, how many trusted Internet domains are to be included in the Internet domain whitelist. For example, hardware-configuration module 114 may determine, based on the traffic scanning ability of network gateway system 230, how many trusted Internet domains are to be included in Internet domain whitelist 126. In some embodiments, the number of Internet domains selected for whitelisting may be inversely proportional to the traffic scanning ability of a gateway system. For example, hardware-configuration module 114 may select more Internet domains to whitelist for gateway systems with relatively low scanning abilities (e.g., ability to scan packets) than for gateway systems with relatively high scanning abilities. Alternatively, the number of Internet domains selected for whitelisting may be proportional to the traffic scanning ability of a gateway system. Since a large whitelist may burden a network gateway system, hardware-configuration module 114 may select less Internet domains to whitelist for gateway systems with relatively low scanning abilities (e.g., abilities to handle whitelists) than for gateway systems with relatively high scanning abilities. In view of the potentially conflicting needs to keep a whitelist small enough to be manageable and large enough to be effective, hardware-configuration module 114 may use any suitable algorithm and/or heuristic to optimize the size of a whitelist for network gateway systems such that the whitelist is not so large that it slows down the network gateway systems and not so small that the performance of the network gateway systems is degraded from scanning too much incoming traffic.

Returning to FIG. 3, at step 308 one or more of the systems described herein may include the selected subset of trusted Internet domains in an Internet domain whitelist. For example, whitelist module 110 may include the subset of Internet domains selected by selection module 108 in Internet domain whitelist 126.

Whitelist module 110 may include Internet domains in Internet domain whitelist 126 in any suitable manner or context. For example, whitelist module 110 may include the selected subset of trusted Internet domains in a default whitelist for network gateways with limited processing power. In some embodiments, whitelist module 110 may create different default whitelists for different models of gateway systems and/or for different gateway system hardware configurations. Additionally or alternatively, whitelist module 110 may include the subset of Internet domains in a custom whitelist for a particular gateway system and/or user.

As used herein, the term "whitelist" generally refers to any type or form of information (e.g., a list or register of entries) that identifies Internet domains for which scanning is to be bypassed and/or reduced. A whitelist may be provided in a list, a register, a set of database entries, a file, and/or in any other suitable format.

In some embodiments, whitelist module 110 may, when including the selected Internet domains in Internet domain whitelist 126, differentiate between trusted high-level domains and sub-domains that may not be trusted. Whitelist module 110 may include a high-level domain in Internet domain whitelist 126 while excluding one or more sub-domains of the high-level domain. For example, whitelist module 110 may include the domain "www.google.com" in Internet domain whitelist 126 while excluding the domain "mail.google.com," which may be a source of untrusted attachments and other content, from Internet domain whitelist 126.

At step 310 in FIG. 3, one or more of the systems described herein may configure a network gateway system to perform a less intensive scan on Internet traffic that originates from an Internet domain identified in the Internet domain whitelist than on traffic that originates from other Internet domains. For example, security module 112 may configure network gateway system 230 to perform a less intensive scan on Internet traffic that originates from Internet domains identified in Internet domain whitelist 126 than on traffic that originates from other Internet domains. As used herein, the phrase "less intensive scan" generally refers to any scanning of Internet traffic (e.g., packets) that is less than a full scan, less than scans typically performed on content from untrusted Internet domains, and/or any scan that is limited in any other way. In some embodiments, security module 112 may perform less intensive scanning on content from trusted Internet domains by bypassing scanning and/or processing completely, as discussed in greater detail below.

Security module 112 may configure network gateway system 230 in any suitable manner. For example, security module 112 may send Internet domain whitelist 126 to network gateway system 230. Network gateway system 230 may then incorporate Internet domain whitelist 126 into its scanning processes. For example, network gateway system 230 may use Internet domain whitelist 126 as an initial whitelist, may use Internet domain whitelist 126 to update an existing whitelist (e.g., whitelist 232), and/or may use Internet domain whitelist 126 to replace an existing whitelist.

Alternatively, security module 112 may directly configure network gateway system 230 with Internet domain whitelist 126 instead of simply sending Internet domain whitelist 126 to network gateway system 230. For example, security module 112 may access a configuration portal or interface of network gateway system 230 to configure network gateway system 230 with Internet domain whitelist 126. As another example, security module 112 may configure network gateway system 230 by sending Internet domain whitelist 126 to a user (e.g., an administrator) of network gateway system 230 to enable the user to configure network gateway system 230 with Internet domain whitelist 126.

As noted above, security module 112 may configure network gateway system 230 to perform a less intensive scan on Internet traffic that originates from any Internet domain identified in Internet domain whitelist 126 by configuring network gateway system 230 to refrain from scanning data that originates from any Internet domain identified in Internet domain whitelist 126. In some embodiments, security module 112 may configure network gateway system 230 to perform a less intensive scan on Internet traffic that originates from any Internet domain identified in Internet domain whitelist 126 by configuring network gateway system 230 to bypass central-processing-unit processing of data that originates from any Internet domain identified in Internet domain whitelist 126. For example, security module 112 may determine that network gateway system 230 is capable of hardware acceleration that bypasses all processing for incoming traffic and may configure the hardware acceleration capability of network gateway system 230 to bypass processing entirely for traffic from any Internet domain identified in Internet domain whitelist 126.

As discussed above, embodiments of the instant disclosure may enable intelligent and effective whitelisting for traffic scanning on gateway devices and may be particularly useful on gateway devices with limited resources. By obtaining knowledge about threats from and/or reputations of Internet domains, along with knowledge of Internet domain traffic patterns, embodiments of the instant disclosure may generate and deliver a database of trusted domains that may be small enough to be effectively delivered and leveraged on resource-constrained gateways while being large enough to cover the most popular high-traffic websites.

Figure 5:
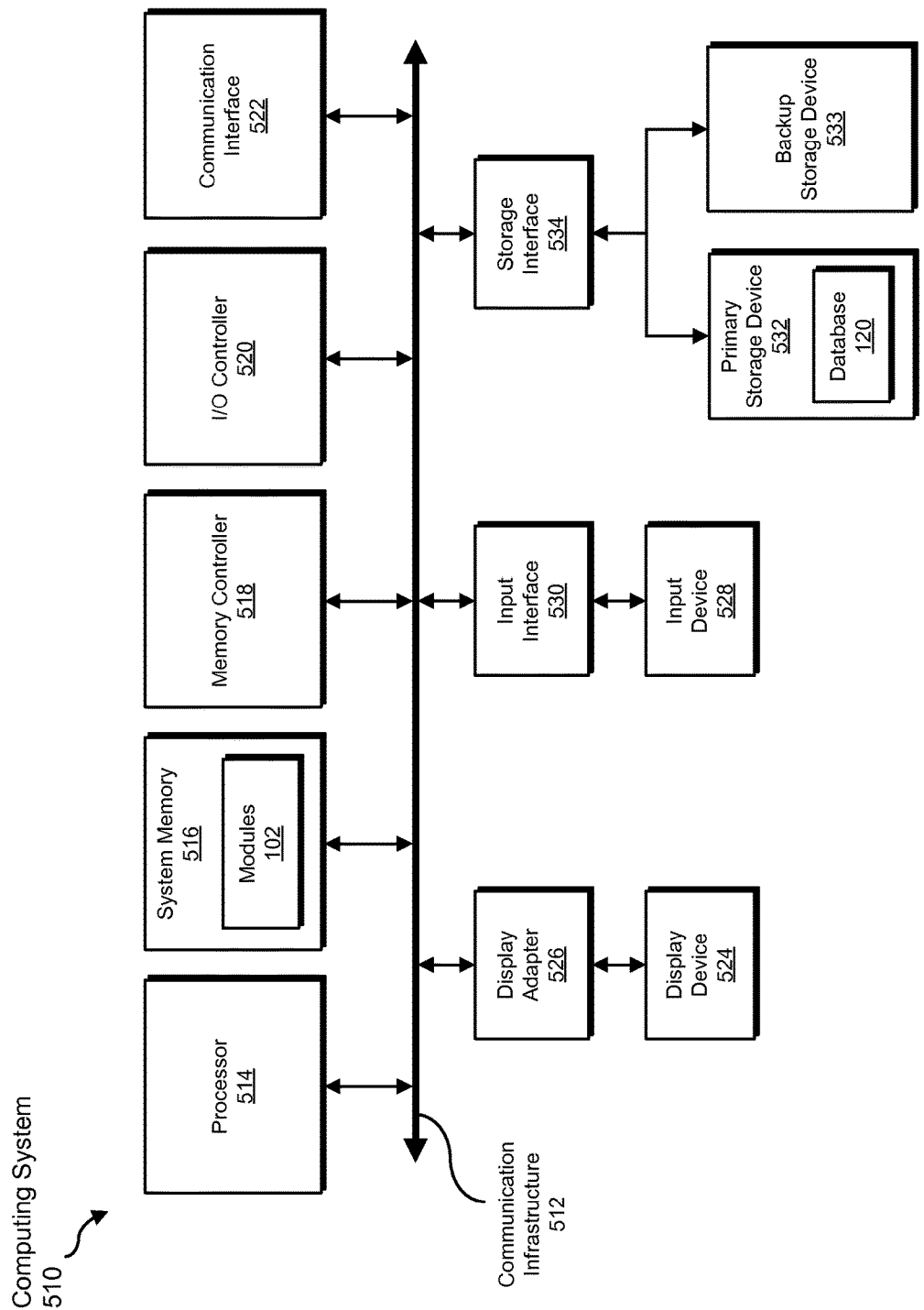
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 may include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 may include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
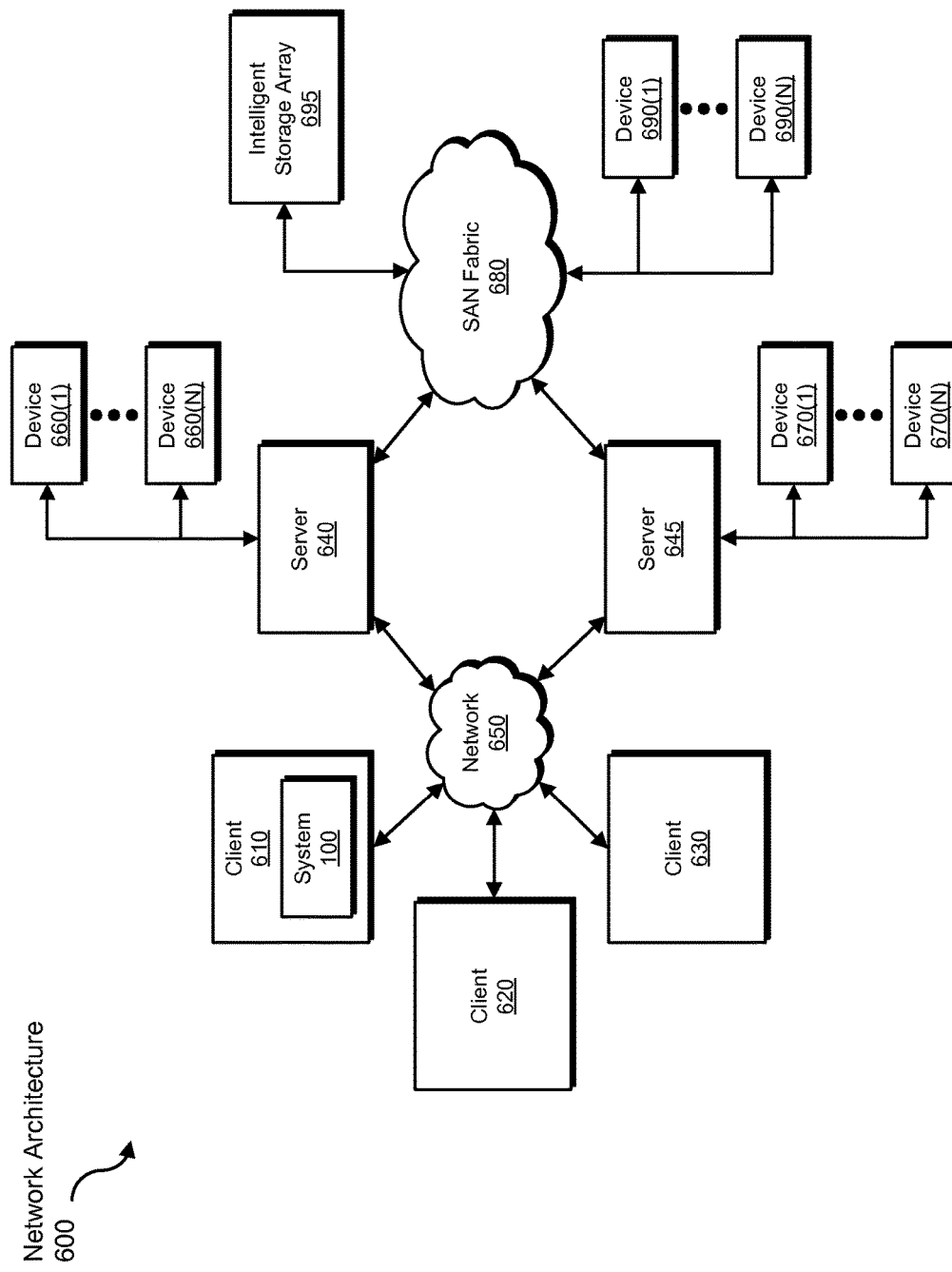
FIG. 6 is a block diagram of an exemplary network architecture capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that storage devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing network security.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive domain traffic and reputation information to be transformed, transform the domain traffic and reputation information into a whitelist, output a result of the transformation to configure a gateway device, and/or use the result of the transformation to configure a network gateway device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing network security, at least a portion of the method being performed by a computing device comprising at least one processor, the method comprising:

identifying, via a domain-identification module, a set of trusted Internet domains, wherein each of the Internet domains was selected to be included in the set of trusted Internet domains based on a reputation of the Internet domain;

identifying, via a traffic-identification module, traffic information that indicates Internet traffic volume for each trusted Internet domain in the set of trusted Internet domains;

analyzing, via a selection module, the traffic information to select, from the set of trusted Internet domains, a subset of trusted Internet domains that each have higher Internet traffic volume than one or more other trusted Internet domains in the set of trusted Internet domains;

including, via a whitelist module, the selected subset of trusted Internet domains in an Internet domain whitelist and excluding, from the Internet domain whitelist, one or more untrusted subdomains of any Internet domain included in the Internet domain whitelist;

configuring, via a security module, a network gateway system to perform a less intensive scan on Internet traffic that originates from an Internet domain identified in the Internet domain whitelist than on traffic that originates from other Internet domains.

2. The computer-implemented method of claim 1 further comprising:

determining a hardware configuration of the network gateway system;

determining that the hardware configuration of the network gateway system limits traffic scanning ability of the network gateway system;

determining, based on the traffic scanning ability of the network gateway system, how many trusted Internet domains are to be included in the Internet domain whitelist.

3. The computer-implemented method of claim 1, wherein configuring the network gateway system to perform a less intensive scan on Internet traffic that originates from any Internet domain identified in the Internet domain whitelist comprises configuring the network gateway system to refrain from scanning data that originates from any Internet domain identified in the Internet domain whitelist.

4. The computer-implemented method of claim 1, wherein:
identifying the set of trusted Internet domains comprises:
receiving, from a plurality of users within a community of users, information about content received from a plurality of Internet domains;
using the information about the content received from the plurality of Internet domains to establish the reputation of each Internet domain in the plurality of Internet domains;
selecting, based on the reputation of each Internet domain in the plurality of Internet domains, at least one Internet domain for inclusion in the set of trusted Internet domains;
determining the reputation for each Internet domain in the plurality of Internet domains comprises, for each Internet domain:
identifying, within the information about the content received from the plurality of Internet domains, information about any security events triggered by the Internet domain;
using the security event information to determine the reputation of the Internet domain.

5. The computer-implemented method of claim 1, wherein
identifying the set of trusted Internet domains comprises:
querying a domain reputation source for domain reputation information;
selecting, based on the domain reputation information, at least one Internet domain for inclusion in the set of trusted Internet domains.

6. The computer-implemented method of claim 1, wherein configuring the network gateway system to perform a less intensive scan on Internet traffic that originates from an Internet domain identified in the Internet domain whitelist comprises sending the Internet domain whitelist to the network gateway system.

7. The computer-implemented method of claim 1, wherein configuring the network gateway system to perform a less intensive scan on Internet traffic that originates from an Internet domain identified in the Internet domain whitelist comprises using the Internet domain whitelist to update a whitelist already included in the network gateway system.

8. The computer-implemented method of claim 3, wherein configuring the network gateway system to refrain from scanning data that originates from any Internet domain identified in the Internet domain whitelist comprises configuring the network gateway system to bypass central-processing-unit processing of data that originates from any Internet domain identified in the Internet domain whitelist.

9. A system for managing network security, the system comprising:
a domain-identification module that identifies a set of trusted Internet domains, wherein each of the Internet domains was selected to be included in the set of trusted Internet domains based on a reputation of the Internet domain;
a traffic-identification module that identifies traffic information that indicates Internet traffic volume for each trusted Internet domain in the set of trusted Internet domains;
a selection module that analyzes the traffic information to select, from the set of trusted Internet domains, a subset of trusted Internet domains that each have higher Internet traffic volume than one or more other trusted Internet domains in the set of trusted Internet domains;
a whitelist module that includes the selected subset of trusted Internet domains in an Internet domain whitelist and excludes, from the Internet domain whitelist, one or more untrusted subdomains of any Internet domain included in the Internet domain whitelist;
a security module that configures a network gateway system to perform a less intensive scan on Internet traffic that originates from an Internet domain identified in the Internet domain whitelist than on traffic that originates from other Internet domains;
at least one hardware processor that executes the domain-identification module, the traffic-identification module, the selection module, the whitelist module, and the security module.

10. The system of claim 9, further comprising a hardware configuration module that:
determines a hardware configuration of the network gateway system;
determines that the hardware configuration of the network gateway system limits traffic scanning ability of the network gateway system;
determines, based on the traffic scanning ability of the network gateway system, how many trusted Internet domains are to be included in the Internet domain whitelist.

11. The system of claim 9, wherein the security module configures the network gateway system to perform a less intensive scan on Internet traffic that originates from any Internet domain identified in the Internet domain whitelist by configuring the network gateway system to refrain from scanning data that originates from any Internet domain identified in the Internet domain whitelist.

12. The system of claim 9, wherein the domain-identification module identifies the set of trusted Internet domains by:
receiving, from a plurality of users within a community of users, information about content received from a plurality of Internet domains;
using the information about the content received from the plurality of Internet domains to establish the reputation of each Internet domain in the plurality of Internet domains;
selecting, based on the reputation of each Internet domain in the plurality of Internet domains, at least one Internet domain for inclusion in the set of trusted Internet domains.

13. The system of claim 9, wherein the security module configures the network gateway system to perform a less intensive scan on Internet traffic that originates from an Internet domain identified in the Internet domain whitelist by sending the Internet domain whitelist to the network gateway system.

14. The system of claim 9, wherein the security module configures the network gateway system to perform a less intensive scan on Internet traffic that originates from an Internet domain identified in the Internet domain whitelist by using the Internet domain whitelist to update a whitelist already included in the network gateway system.

15. The system of claim 11, wherein the security module configures the network gateway system to refrain from scanning data that originates from any Internet domain identified in the Internet domain whitelist by configuring the network gateway system to bypass central-processing-unit processing of data that originates from any Internet domain identified in the Internet domain whitelist.

16. The system of claim 12, wherein the domain-identification module determines the reputation for each Internet domain in the plurality of Internet domains by, for each Internet domain:
   identifying, within the information about the content received from the plurality of Internet domains, information about any security events triggered by the Internet domain;
   using the security event information to determine the reputation of the Internet domain.

17. A non-transitory computer-readable medium comprising one or more computer-executable instructions that, when executed by at least one processor of a computing device, cause the computing device to:
   identify a set of trusted Internet domains, wherein each of the Internet domains was selected to be included in the set of trusted Internet domains based on a reputation of the Internet domain;
   identify traffic information that indicates Internet traffic volume for each trusted Internet domain in the set of trusted Internet domains;
   analyze the traffic information to select, from the set of trusted Internet domains, a subset of trusted Internet domains that each have higher Internet traffic volume than one or more other trusted Internet domains in the set of trusted Internet domains;
   include the selected subset of trusted Internet domains in an Internet domain whitelist and exclude, from the Internet domain whitelist, one or more untrusted subdomains of any Internet domain included in the Internet domain whitelist;
   configure a network gateway system to perform a less intensive scan on Internet traffic that originates from an Internet domain identified in the Internet domain whitelist than on traffic that originates from other Internet domains.

18. The non-transitory computer-readable medium of claim 17, wherein the one or more computer-executable instructions, when executed by the processor of the computing device, cause the computing device to:
   determine a hardware configuration of the network gateway system;
   determine that the hardware configuration of the network gateway system limits traffic scanning ability of the network gateway system;
   determine, based on the traffic scanning ability of the network gateway system, how many trusted Internet domains are to be included in the Internet domain whitelist.

19. The non-transitory computer-readable medium of claim 17, wherein the one or more computer-executable instructions configure the network gateway system to perform a less intensive scan on Internet traffic that originates from any Internet domain identified in the Internet domain whitelist by configuring the network gateway system to refrain from scanning data that originates from any Internet domain identified in the Internet domain whitelist.

20. The non-transitory computer-readable medium of claim 17, wherein the one or more computer-executable instructions configure the network gateway system to refrain from scanning data that originates from any Internet domain identified in the Internet domain whitelist by configuring the network gateway system to bypass central-processing-unit processing of data that originates from any Internet domain identified in the Internet domain whitelist.

* * * * *